(12) United States Patent
Tanaka

(10) Patent No.: US 8,179,421 B2
(45) Date of Patent: May 15, 2012

(54) IMAGE SYNTHESIZING DEVICE AND METHOD AND COMPUTER READABLE MEDIUM

(75) Inventor: Shingo Tanaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1278 days.

(21) Appl. No.: 11/855,316

(22) Filed: Sep. 14, 2007

(65) Prior Publication Data

US 2008/0117285 A1    May 22, 2008

(30) Foreign Application Priority Data

Nov. 21, 2006  (JP) ................................. 2006-314176

(51) Int. Cl.
*H04N 7/14* (2006.01)
(52) U.S. Cl. ................. 348/14.09; 348/14.08; 348/14.01
(58) Field of Classification Search .... 348/14.01–14.16; 270/260–261; 709/204–205
See application file for complete search history.

(56) References Cited

U.S. PATENT DOCUMENTS

| 2006/0170762 | A1 | 8/2006 | Tanaka et al. | |
| 2006/0215765 | A1* | 9/2006 | Hwang et al. | ............ 375/240.21 |
| 2007/0046679 | A1 | 3/2007 | Tanaka | |
| 2007/0206089 | A1* | 9/2007 | Eshkoli et al. | ............ 348/14.02 |

FOREIGN PATENT DOCUMENTS

| JP | 05-103324 | 4/1993 |
| JP | 7-66876 | 3/1995 |
| JP | 08-88842 | 4/1996 |
| JP | 11-88854 | 3/1999 |
| JP | 2000-115737 | 4/2000 |
| JP | 2000-253374 | 9/2000 |
| JP | 2003-134487 | 5/2003 |
| JP | 2005-244391 | 9/2005 |
| JP | 2006-222942 | 8/2006 |

OTHER PUBLICATIONS

N. Shibuya, et al., "Apparatus for Synthesizing Information, Apparatus for Controlling Information, and Computer Program Product", U.S. Appl. No. 11/791,492, filed May 24, 2007.
Digital Video Processor Single Quad AQ-414 Catalog; ALOGICS Co., Ltd.
Digital Video Processor Single Quad AQ-424 Catalog; ALOGICS Co., Ltd.
S. Tanaka, et al., "Flexibly Layout Controllable Multi-Out Video Mixing Processor", Proc. of the 2005 IEICE Society Conference (2005).
Notification of Reason for Rejection issued by the Japanese Patent Office on Nov. 4, 2008, for Japanese Patent Application No. 2006-314176, and English-language translation thereof.

* cited by examiner

*Primary Examiner* — Melur Ramakrishnaiah
(74) *Attorney, Agent, or Firm* — Finnegan, Henderson, Farabow, Garrett & Dunner, L.L.P.

(57) ABSTRACT

There is provided with an image synthesizing device, including: a connection unit configured to connect to another image synthesizing device; a layout storage configured to store the image layout information of one or more synthesized image where a plurality of input images input into the image synthesizing device and the another image synthesizing device are laid out in desired positions; and one or more synthesized image generating units configured to generate one or more synthesized images using the image information read by a reading control unit of the image synthesizing device and the image information received by an image information receiving unit from the another image synthesizing device.

12 Claims, 11 Drawing Sheets

| | LINE NUMBER | | | |
|---|---|---|---|---|
| PIXEL DATA OUTPUT FROM SYNTHESIZING UNIT | X | X+1 | X+2 | ... |
| PIXEL DATA FROM SDRAM CONTROLLER TO SYNTHESIZING UNIT | X+1 | X+2 | X+3 | ... |
| REQUEST INFORMATION FROM REQUESTING UNIT TO SDRAM CONTROLLER | X+2 | X+3 | X+4 | ... |

IMAGE SYNTHESIZING DEVICE AND METHOD AND COMPUTER READABLE MEDIUM

CROSS REFERENCE TO RELATED APPLICATIONS

This application is based upon and claims the benefit of priority from the prior Japanese Patent Applications No. 2006-314176, filed on Nov. 21, 2006; the entire contents of which are incorporated herein by reference.

BACKGROUND OF THE INVENTION

1. Field of the Invention

The present invention relates to an image synthesizing device for receiving a plurality of images and outputting a synthesized image thereof.

2. Related Art

So-called a television conference system is known which makes communication by transmitting voice from a microphone, and camera images on a network, and outputting the images to a monitor and a speaker of the party. The simplest example is mutual communication between one terminal and another terminal, however, some television conference systems allow multiple points to communicate with one another at the same time.

When a multipoint television conference is held among a plurality of terminals, if full mesh type connection is used where all the terminals are simply connected to one another, traffic that flows through a network increases, and transmission/reception processing at the terminals, and accompanying encoding and decoding of voice and images increase, thus leading to inefficiency.

Consequently, a measures is usually taken in which a Multipoint Controller (MCU) is provided. An MCU is a type of server, and has functions of connecting to each terminal to receive and synthesize voice or images from each terminal, and send synthesized voice or images to each terminal.

With the MCU, each terminal needs only communicate with the MCU, and receive single synthetic voice and synthesized images from the MCU to obtain voice and images from all participants; therefore, efficiency increases in the terms of the above described traffic and processing amount at the terminals. In this way, an MCU serves an important role in a multipoint television conference, in which image synthesis technique is used.

Another application of image synthesis technique is a screen separation unit for a surveillance camera. Since a plurality of surveillance cameras are usually installed on a building, if the cameras are observed and recorded by separate monitors, large-scale equipment is needed, which is inconvenient. Therefore, a measures is usually taken in which a screen separation unit is used to synthesize a plurality of camera images into one image signal so that the signal may be verified by a single monitor and recorded by a single recorder. Image synthesis technique is also used for the screen separation unit.

Usually, although an MCU has a limit to the accommodations of terminals, if it desired to accommodate terminals beyond this limit, a cascade scheme is used in which an image originally supposed to be output to a terminal is connected with another MCU using multistage connection, as shown in FIG. 14. In FIG. 14, images from four terminals are synthesized at a first stage, MCU 1, and images from further three terminals are synthesized at a second stage, MCU 2; therefore, images from seven terminals in total are synthesized at the two MCUs 1 and 2. This configuration is described in e.g. JP-A 2000-253374 (Kokai).

Only one synthesized image is usually output at an MCU, however, configuration outputting a plurality of synthesized images is also proposed as described in JP-A 2006-222942 (Kokai). In this case, the multistage connection of MCUs is shown in FIG. 15. More specifically, the synthesized image of images input into one of MCU 3 or 4 is sent to another MCU 4 or 3 to share the input image between the MCUs 3 and 4, and, based on the input image, the MCUs 3 and 4 generate and output a plurality of synthesized images. This configuration is described in e.g. JP-A 08-88842(Kokai).

When a plurality of different synthesized images are output as described in e.g. JP-A 2006-222942, one MCU generates a final synthesized image by using the synthesized images output by another MCU, and synthesizing images from terminals which are connected thereto, however, the synthesized images input by the other MCU are treated as one image, therefore, the layout of each image cannot be changed. More specifically, in each synthesized image generated by the MCU, portions synthesized by the other MCU have the same synthetic layout, therefore, there is a problem that the degree of freedom of the synthesized images is reduced.

SUMMARY OF THE INVENTION

According to an aspect of the present invention, there is provided with an image synthesizing device for generating one or more synthesized images from input images using the image layout information prepared in advance for each of the one or more synthesized images, comprising:

a connection unit configured to connect to another image synthesizing device;

a layout storage configured to store the image layout information of one or more synthesized images where a plurality of input images input into the image synthesizing device and the another image synthesizing device are laid out in desired positions;

an image storage configured to temporarily store the plurality of input images;

a first reading request unit configured to perform a first reading request by specifying the input images to be read from the image storage using the image layout information in the layout storage;

a second reading request unit configured to perform a second reading request by specifying the input images to be read from an image storage in the another image synthesizing device using the image layout information in the layout storage;

a request sending unit configured to send the second reading request by the second reading request unit to the another image synthesizing device;

a reading control unit configured to read the input images specified by the first reading request of the first reading request unit from the image storage, as image information;

an image information receiving unit configured to receive the image information sent from an image information sending unit in the another image synthesizing device; and one or more synthesized image generating units configured to generate the one or more synthesized images using the image information read by the reading control unit and the image information received by the image information receiving unit.

According to an aspect of the present invention, there is provided with an image synthesizing method for generating one or more synthesized images from input images using the image layout information prepared in advance for each of the one or more synthesized images, comprising:

connecting to another image synthesizing device;

storing the image layout information of one or more synthesized images where a plurality of input images input into the image synthesizing device and the another image synthesizing device are laid out in desired positions;

storing the plurality of input images temporarily;

performing a first reading request by specifying the input images to be read from the image storage using the image layout information;

performing a second reading request by specifying the input images to be read from an image storage in the another image synthesizing device using the image layout information;

sending the second reading request to the another image synthesizing device;

reading the input images specified by the first reading request from the image storage, as image information;

receiving the image information sent from the another image synthesizing device; and generating the one or more synthesized images using the image information read by the image storage and the image information received from the another image synthesizing device.

According to an aspect of the present invention, there is provided with a computer readable medium storing a computer program for causing a computer generating one or more synthesized images from input images using the image layout information prepared in advance for each of the one or more synthesized images, to execute instructions to perform steps of:

connecting to another image synthesizing device;

storing the image layout information of one or more synthesized images where a plurality of input images input into the image synthesizing device and the another image synthesizing device are laid out in desired positions;

storing the plurality of input images temporarily;

performing a first reading request by specifying the input images to be read from the image storage using the image layout information;

performing a second reading request by specifying the input images to be read from an image storage in the another image synthesizing device using the image layout information;

sending the second reading request to the another image synthesizing device;

reading the input images specified by the first reading request from the image storage, as image information;

receiving the image information sent from the another image synthesizing device; and generating the one or more synthesized images using the image information read by the image storage and the image information received from the another image synthesizing device.

DETAILED DESCRIPTION OF THE INVENTION

Embodiments of the present invention will now be described with reference to drawings.

First Embodiment

Figure 1:
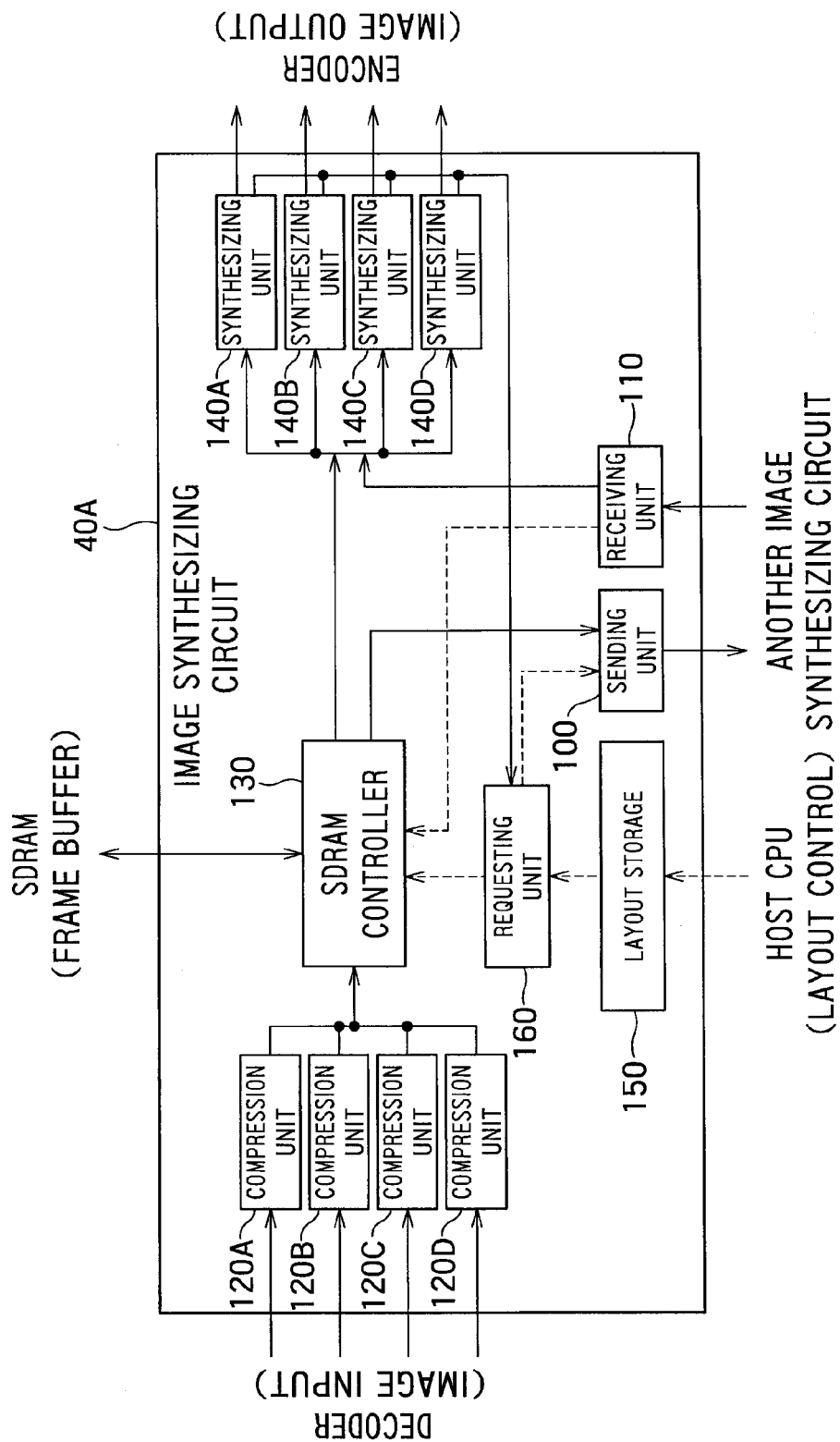
FIG. 1 is a block diagram showing the configuration of an image synthesis circuit according to a first embodiment of the present invention.

A first embodiment of the present invention is shown in FIG. 1. A device according to the present invention is an MCU 10A for e.g. a television conference, which has configuration shown in FIG. 2. In the MCU 10A in FIG. 2, a network processing is first performed by a host CPU 20 to send/receive image streams such as MPEG4 and H.264 to/from each terminal that is connected thereto.

Figure 2:
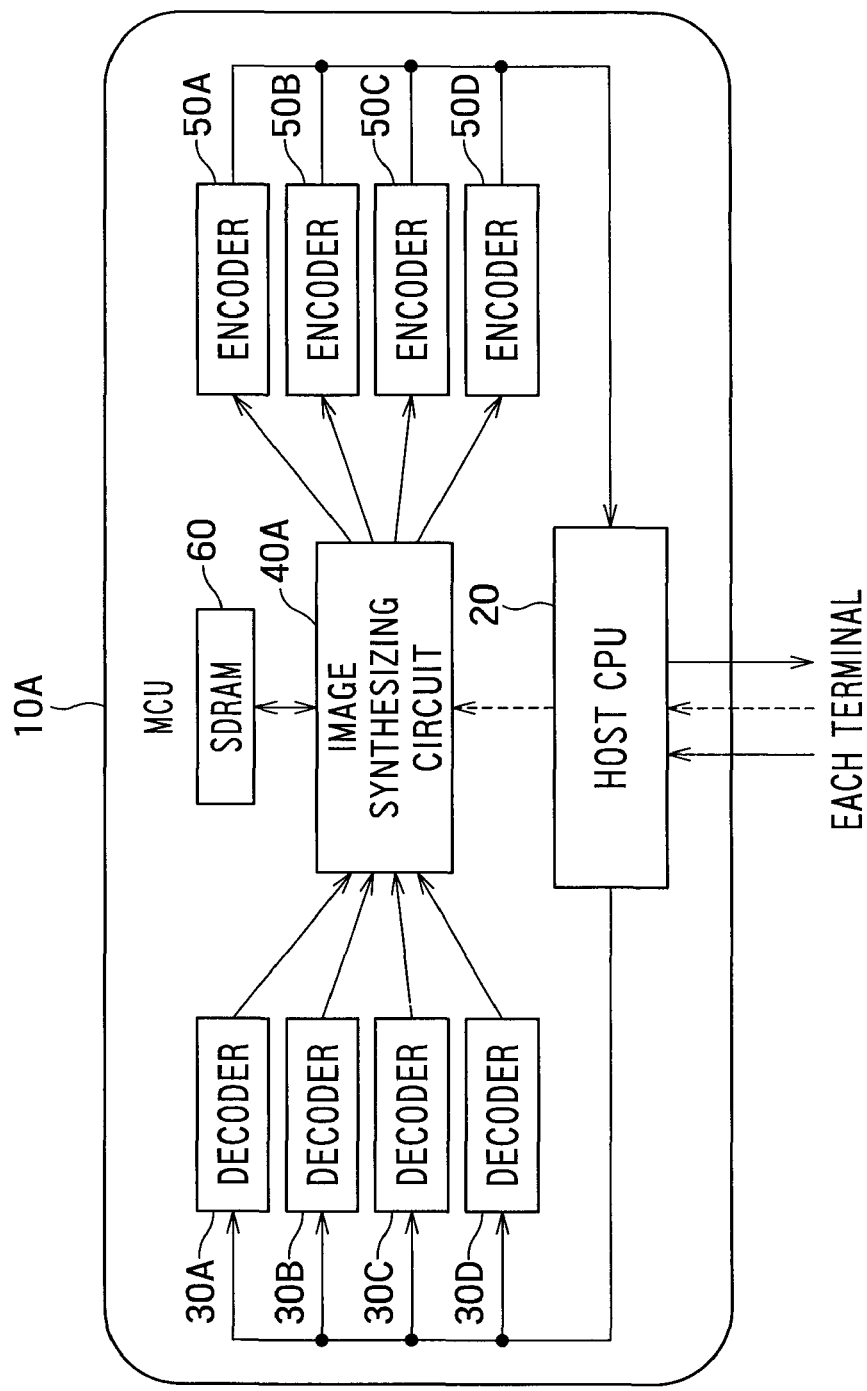
FIG. 2 is a block diagram showing the configuration of an MCU having the image synthesis circuit.

Each stream received from each terminal is input into each of decoders 30A to 30D, each of which is associated with each terminal in FIG. 2, decoded into an image signal, and input into an image synthesis circuit 40A. On the other hand, each terminal can specify the layout of a received synthesized image, and sends layout information (that is, information on image layout) to the MCU 10A; a host CPU 20 in the MCU 10A receives the information and inputs it into the image synthesis circuit 40A.

The image synthesis circuit 40A (that is, an image synthesizing device) synthesizes each input image in a layout specified for each output, and outputs each synthesized image signal. Output image signals are input into encoders 50A to 50D, each of which is associated with each terminal, to generate image streams, and passed to the host CPU 20, which in turn performs network processing and sends each stream to each terminal.

Figure 3:
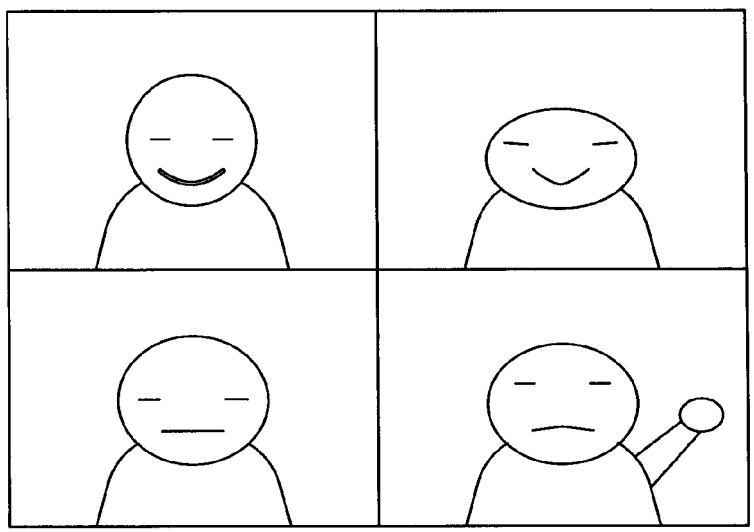
FIG. 3 is an illustration showing an example of a synthesized image.
Figure 4:
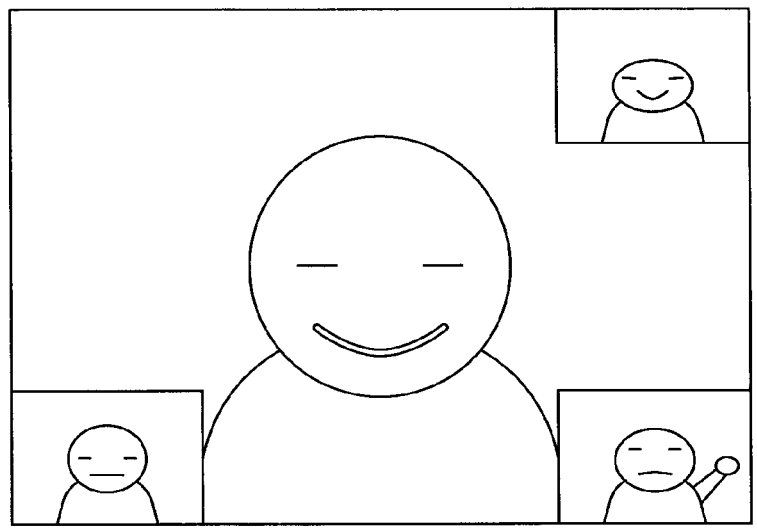
FIG. 4 is an illustration showing an example of a synthesized image.

Examples of synthesized images are shown in FIGS. 3 and 4. In this example, the MCU 10A can be connected to up to four terminals, and provide synthesized images having different synthetic layout for each terminal. The host CPU 20, the decoders 30A to 30D, the encoders 50A to 50D and the image synthesis circuit 40A are each achieved with LSI such as ASIC and FPGA.

Figure 5:
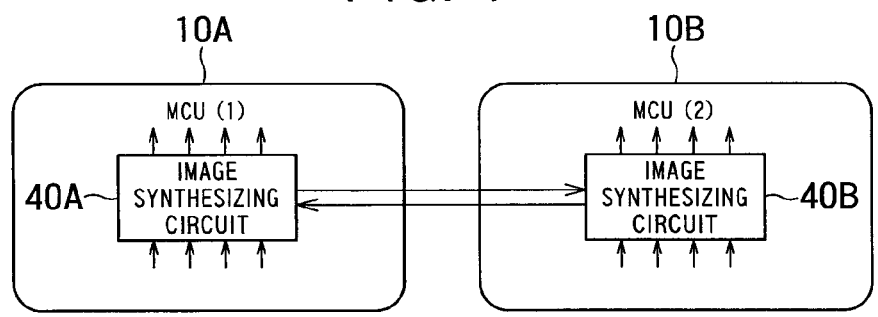
FIG. 5 is a block diagram showing the configuration of a system in which two MCUs are connected.

As shown in FIG. 5, the MCU 10A can be expanded by connecting the image synthesis circuits 40A with 40B, and therefore with another MCU 10B through an exclusive line to send/receive necessary data. In this case, when the MCUs 10A and 10B, each of which has four inputs and four outputs, are connected, synthesis of images from eight inputs and eight outputs can be achieved. The concrete configuration of the image synthesis circuit 40A is shown in FIG. 1. A sending unit 100 is connected to a receiving unit (not shown) of the opposed image synthesis circuit 40B, and a receiving unit 110 is connected to a sending unit (not shown) of the opposed image synthesis circuit 40B.

Incidentally, the sending unit 100 and the receiving unit 110 correspond to connection units; the sending unit 100 corresponds to a request sending unit, an image information sending unit, an information sending unit and a write line number sending unit, and the receiving unit 110 corresponds to a request receiving unit, an image information receiving unit, an information receiving unit and a write line number receiving unit.

As its basic function of the image synthesis circuit 40A when it operates by itself, the image synthesis circuit 40A receives four image signals, and generates and outputs four synthesized images according to instructions as to synthetic layout, which are input separately.

An image signal is a digital signal defined in e.g. International Telecommunication Union-Radiocommunication (ITU-R) BT.656, and 8-bit data (information within one pixel) is used to send pixel data consecutively one by one from upper left to lower right of an image frame. Instead of the pixel data, a synchronizing signal is sent at predetermined timing to synchronize image frames. A synchronizing signal is a set of FF, 00, 00, XX, XX corresponding to a code that indicates a position on the frame, therefore, the coordinates of the present image data is found by reference to XX.

Compression units 120A to 120D (that is, compression units) first analyze the synchronizing signal of the input image signal, compress the image after recognizing the coordinate values of the current pixel data on the image, and pass the pixel data of the compressed input image to an SDRAM controller 130. Coordinate values are recognized by providing a counter to keep coordinates, and setting its value to a coordinate value indicated by the synchronizing signal when the synchronizing signal is recognized, and subsequent coordinates of the pixel data can be obtained by incrementing the counter value by one every time pixel data is input.

The SDRAM controller 130, which controls writing of data into an SDRAM 60 serving as an image frame buffer, writes the pixel data received from the compression units 120A to 120D into the SDRAM 60, and reads and passes the pixel data from the SDRAM 60 to synthesizing units 140A to 140D. There is a frame buffer for the compressed image of each input image on the SDRAM 60.

The SDRAM controller 130 corresponds to reading and writing controllers, and the SDRAM 60 corresponds to image storage.

In addition, the compression units 120A to 120D may generate in parallel a plurality of compressed images such as ¹⁄₁ compression, ½ compression, ⅓ compression and ¼ compression, relative to each input image; in this case, since four compressed images are generated for each of the four input images, there are frame buffers for 4×4=16 images.

A layout storage 150 receives layout information from the host CPU 20 and keeps the latest layout information for each synthesized image.

The synthesizing units 140A to 140D (that is, synthesized image generating units) use the pixel data received from the SDRAM controller 130 to generate and output a synthesized image signal, which may contain a synchronizing signal and a blank period, as necessary. At the same time, the synthesizing units 140A to 140D generate, as a counter value, the coordinates of the pixel which is currently being output, and notify a requesting unit 160 of the coordinate information.

The requesting unit 160 analyzes the information and the synthetic layout information from the layout storage 150, reads ahead and specifies, among the synthesized images, the input image or its compressed image which is positioned on the coordinates and synthesized by the synthesizing units 140A to 140D, and the coordinates of necessary pixels in the image, derives request information from the specified information, and passes the request information to the SDRAM controller 130 to make a request.

Thus far, a case where the image synthesis circuit 40A operates by itself has been described. Next, the operation of the image synthesis circuit in a case where the image synthesis circuit is connected to an image synthesis circuit 40B in another MCU 10B as shown in FIG. 5 will be described, which is the subject matter of the present embodiment.

Figures 6, 7:
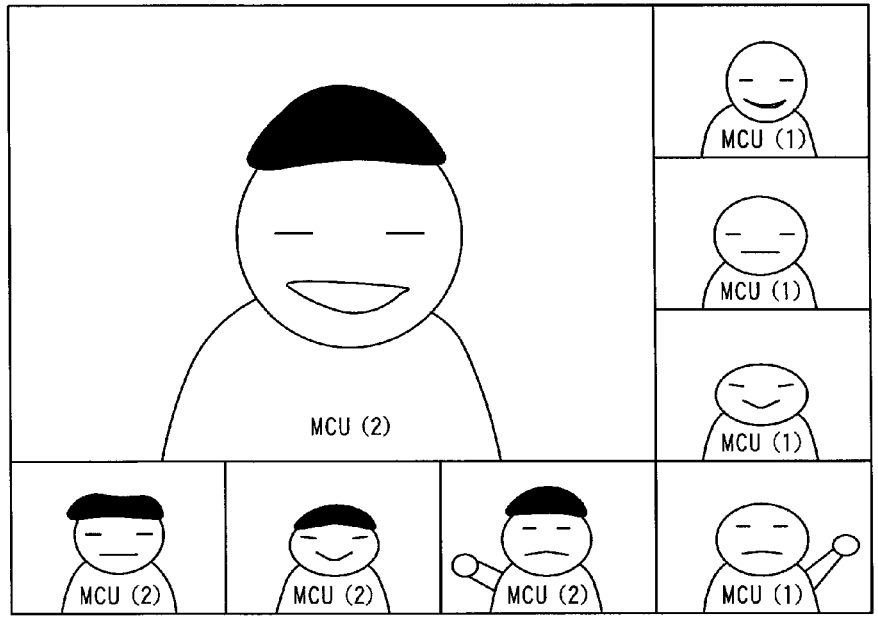
FIG. 6 is an illustration showing an example of a synthesized image.
FIG. 7 is an illustration showing a manner of scheduling in an image synthesis circuit.

In this case, the layout information received by the layout storage 150 from the host CPU 20 is not only the layout information for input image that is input into its own MCU 10A, but also the layout information for an image into which input images are input into the other MCU 10B are also synthesized. For example, as shown in FIG. 6, a synthesized image consists of four images input into the MCU (1) 10A and four images input into the MCU (2) 10B, that is, eight images in total.

More specifically, the present embodiment operates as described below. Since the pixel data of the input image for its own MCU 10A may be read from its own SDRAM 60, and the pixel data of the input image for the other MCU 10B may be read from an SDRAM (not shown) in the other MCU 10B, the requesting unit 160 (that is, first and second reading request units) analyzes the layout information, generates request information for the input image to be requested to its own SDRAM controller 130, and request information for the input image to be requested to the SDRAM controller (not shown) in the other MCU 10B, respectively, and passes the former to the SDRAM controller 130, and the latter to the sending unit 100 so as to be sent to the other MCU 10B. The sending unit 100 sends the information to the other MCU 10B.

On the other hand, the receiving unit 110 receives the request information from the other MCU 10B, and passes the received request information to the SDRAM controller 130. The SDRAM controller 130 receives request not only from its own MCU 10A but also from the other MCU 10B, and passes the read pixel data to the synthesizing units 140A to 140D in response to the request from its own MCU, and the read pixel data to the sending unit 100 in response to the request from the other MCU so as to be sent to the other MCU 10B.

On the other hand, the receiving unit 110 receives the pixel data from the other MCU 10B, as a response to the request information that is sent to the other MCU 10B. The synthesizing units 140A to 140D can use the pixel data from the SDRAM controller 130 for its own input image, and the pixel data from the receiving unit 110 for the input image of the other MCU 10B to generate a synthesized image where the input images from the MCUs 10A and 10B are laid out.

As described above, by connecting the image synthesizing circuits 40A and 40B to each other, image data can be sent and received without an encoder or a decoder unlike conventional ways, therefore, it is possible to prevent traffic from increasing, and image quality from being degraded. In addition, a synthesized image can be generated by using the input images from the other MCU 10B as well as its own input images, therefore it is possible to prevent the degree of freedom of the synthetic layout from being impaired.

Incidentally, although an example of four inputs and four outputs has been shown, the number of inputs and outputs is an insignificant matter, and any number of inputs and outputs may be used. In addition, any type of image signals may be used other than BT.656, and any manner may be used, for example, Vsync or Hsync may be exchanged as a synchronizing signal. The embodiment may be not necessarily a separate LSI as described above. It may be implemented as part of a device.

The nature of the present invention is the same even if the compression units 120A to 120D are not provided, however, the use of the compression units 120A to 120D allows more flexible layout to be used to generate a synthesized image, resulting in increase in the effect of the present embodiment.

Further, although examples of 1/1 compression, 1/2 compression, 1/3 compression and 1/4 compression have been described as compression patterns of the compression units 120A to 120D, the present embodiment is not limited thereto, alternatively any compression size may be used, in addition, dynamically variable size according to the layout information may be used.

The sending unit 100 sends a plurality types of data as described above, however, the number of lines for connecting the MCUs 10A and 10B to each other may be reduced by multiplexing data to be sent, therefore, it is possible to facilitate the connection of the MCUs 10A and 10B, as a result, it is possible to facilitate the achievement of the present embodiment.

Regarding the multiplexing method, multiplexing may be at the logical level by adding a header indicating the type of data at the beginning of the data so that the receiving unit 110 can identify the data, it may be a serialization at the signal level by time-division multiplexing a plurality of signal lines into one signal line, or it may be a combination of both. A signal standard having high noise immunity such as Low Voltage Differential Signaling (LVDS) may be used to transmit signals between devices.

Second Embodiment

In a second embodiment of the present invention, the timing of operation in the device having the same configuration as that of the first embodiment shown in FIG. 1 will be described in detail.

Although the SDRAM 60 has been described as an example of RAM (image frame buffer) in the first embodiment, SRAM or the like may be used, or SRAM having a plurality of ports may be used so that the first port may be used for writing and the second port for reading.

However, a limit is usually set on the number of ports, and only one port is provided on a usual SDRAM, therefore, the SDRAM controller 130 has to conduct some arbitration in response to the writing requests from a plurality of compression units 120A to 120D and the reading requests from a plurality synthesizing units 140A to 140D as described above, and access the RAM using a time division multiplex method.

A buffer (not shown) for absorbing the access waiting time may exist before and after the SDRAM controller 130, that is, in a portion where the compression units 120A to 120D pass data to the SDRAM controller, and a portion where the synthesizing units 140A to 140D receive data from the SDRAM controller 130.

A buffer (not shown) for absorbing waiting time may be also provided on the sending unit 100 and the receiving unit 110, because waiting time is needed to send each data when data is multiplexed.

More specifically, given that the above buffer is provided, the embodiment operates as described below. The compression units 120A to 120D first input the input images for each pixel, and buffer the pixel data of compressed images while compressing the input images as needed.

For example, when one line of the compressed image is accumulated in the buffer, a writing request is issued to the SDRAM controller 130. The SDRAM controller 130 might not immediately react if it is dealing with a request from others, however, as soon as available, the SDRAM controller responds to the request from the above compression units 120A to 120D, retrieves one line of data from the buffers of the compression units 120A to 120D, and writes the data into the predetermined frame buffer for the SDRAM 60 at the address on the predetermined line.

On the other hand, the synthesizing units 140A to 140D have to output a synthesized image at a constant timing for each pixel, therefore, required pixel data has to always exist in the buffers of the synthesizing units 140A to 140D.

Therefore, the requesting unit 160 reads ahead the pixel data required for synthesizing the line that is ahead of the line currently being synthesized by the synthesizing units 140A to 140D, and makes a request. For example, if the data of the synthesized image is to be buffered line by line into the buffers of the synthesizing unit 140A to 140D, the requesting unit 160 generates the request information for the line that is two lines ahead of the line currently being synthesized by the synthesizing units 140A to 140D, and passes the information to the SDRAM controller 130 and the sending unit 100. The sending unit 100 passes the information to the SDRAM controller in the other MCU 10B by the time when the processing of the line is completed.

The SDRAM controllers 130 in its own MCU 10A and the other MCU 10B temporarily buffer the request information, read the received request information when the processing of the synthesizing units 140A to 140D goes to the next line, read pixel data from the SDRAM 60 according to the read request information by the time when the processing of the line is completed, and pass the pixel data to the synthesizing units 140A to 140D and the sending unit in the other MCU 10B, respectively.

The sending unit in the other MCU 10B sends the pixel data to its own MCU 10A by the time when the processing of the line is completed, and passes the pixel data to the synthesizing units 140A to 140D.

When the processing of the synthesizing units 140A to 140D goes to the next line, the synthesizing units 140A to 140D can retrieve required pixel data from the buffer.

The above scheduling is shown in FIG. 7. FIG. 7 shows how the synthesizing units 140A to 140D process the lines x, x+1, x+2, . . . of the synthesized image, where the entirety operates line by line like a pipe line. The above each buffer may have any configuration, such as a double buffer form and a FIFO buffer.

As described above, the scheduling of the operation of the present embodiment may be simply achieved by operating the entirety line by line like a pipe line, therefore, it is possible to facilitate the achievement of the present embodiment.

In addition, if, as described above, the request information for the line that is two lines ahead of the line currently being synthesized by the synthesizing units 140A to 140D is generated, it suffices to perform scheduling so that processing by the requesting unit 160 and processing by the SDRAM controller 130 each lasts for the duration of simply one line; therefore, the logic can be simplified compared to the case where the request information for the line that is one line ahead is generated, and the memory for the buffers can be saved compared to the case where the request information for the line that is three lines ahead is generated.

Since there are a plurality of pieces of pixel data to be passed to the synthesizing units 140A to 140D coming from its own SDRAM controller 60 and the other image synthesizing circuit 40B, and the order in which the data is passed and the order in which the data is to be read are not necessarily the same if the data is passed in random order, additional information on order is needed in which the pixel data is read to generate the line of the synthesized image.

In this case, since the requesting unit 160 analyzes the synthetic layout, the request information to be passes to the SDRAM controller 130 described above and synthetic information to define the order of synthesis are generated and passed to the synthesizing units 140A to 140D.

Figure 8:
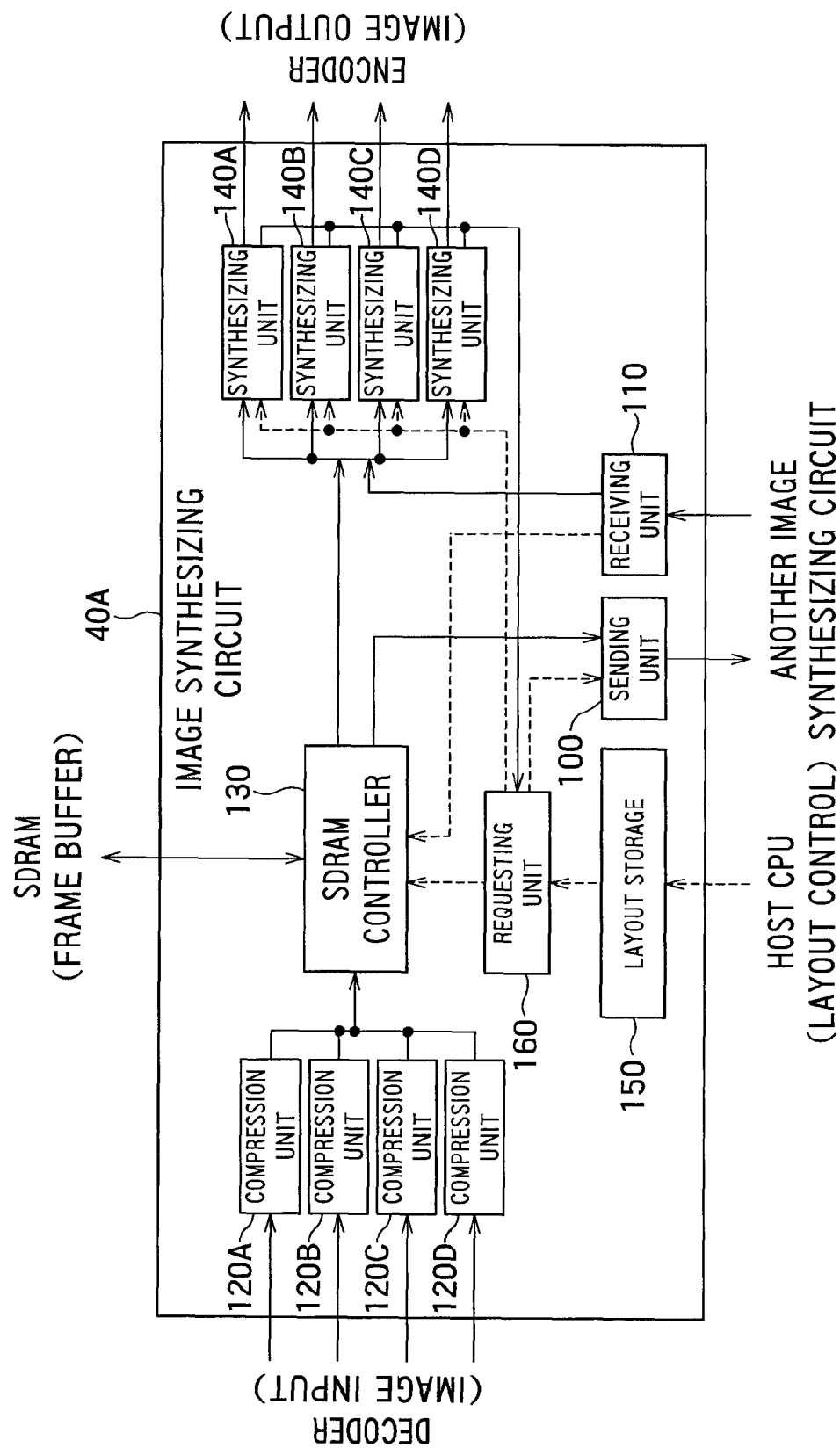
FIG. 8 is a block diagram showing the configuration of an image synthesis circuit according to a second embodiment of the present invention.

This manner is shown in FIG. 8. Since the line of the synthesized image has to be output from the left pixel data if data read from the SDRAM 60 in its own MCU 10A is laid out on the left side of the synthesized image, and data read from the SDRAM 60 in the other MCU 10B is laid out the right side of the synthesized image, the requesting unit 160 (that is, a synthetic information generation unit) passes synthetic information to the synthesizing units 140A to 140D, which indicates that its own pixel data is read before the pixel data from the other MCU 10B is read.

In this way, the order in which the pixel data from its own SDRAM 130 is received by the synthesizing units 140A to 140D and the order in which the pixel data from the SDRAM in the other MCU 10B is received do not have to be associated with the synthetic layout, therefore, the operation of the image synthesizing circuits 40A and 40B may be asynchronous.

Usually a clock has to be shared in order to synchronize a plurality of separate circuits, and it is difficult to synchronize the circuits provided on different devices in particular, however, if the image synthesizing circuits 40A and 40B can asynchronously operate as described above, it is possible to facilitate the achievement of the present embodiment.

In addition, in so doing, if the operation is to be performed line by line like a pipe line as described above, since the requesting unit 160 generates the request information after analyzing the line of the synthesized image that is two lines ahead, it is desirable that the synthesis information is also for the same line that is two lines ahead.

Therefore, if the synthesizing units 140A to 140D temporarily buffer the received synthesis information, and use the received synthesis information when the line number advances by two, it suffices that the requesting unit 160 generates the synthesis information for the same line that is two lines ahead as for the request information.

In this way, the requesting unit 160 has to only analyze one line (the line that is two lines ahead) in the synthetic layout at a time, therefore, it is possible to increase processing efficiency, and facilitate the achievement of the present embodiment.

Third Embodiment

Figure 9:
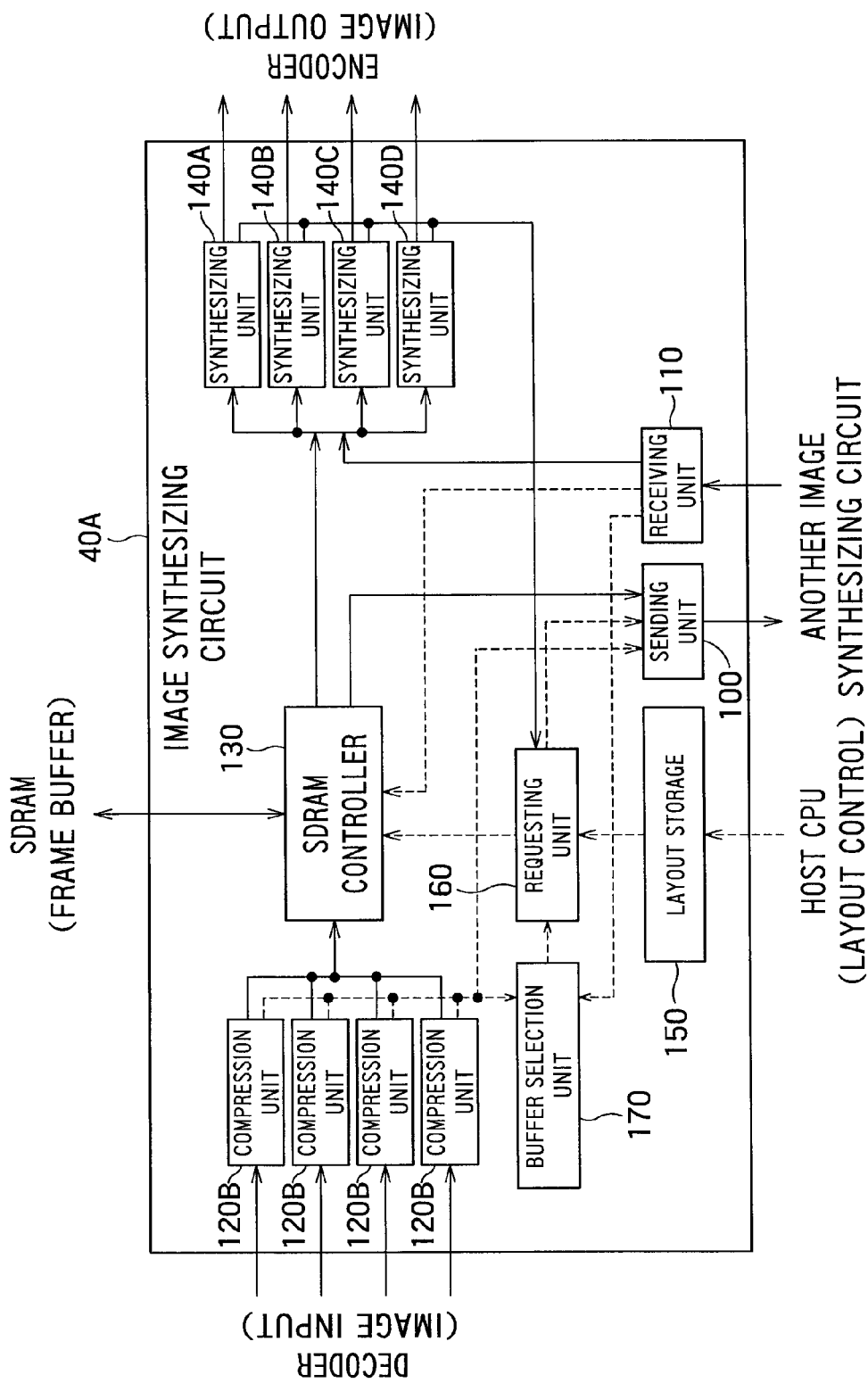
FIG. 9 is a block diagram showing the configuration of an image synthesis circuit according to a third embodiment of the present invention.

A third embodiment of the present invention is shown in FIG. 9. In the third embodiment, a frame buffer on the SDRAM 60 has double buffer configuration.

Incidentally, double buffer configuration means configuration having two frame buffers on RAM (that is, the first and second storage) to prevent access competition. For example, when writing frames, a writing side alternately writes them into the two buffers. On the other hand, a reading side reads them from the buffer where writing is not being performed. In other words, a buffer to write into and a buffer to read from are alternately switched. In this way, since writing is always completed in the buffer to read from, integrity is assured, therefore, it is possible to prevent the images from being corrupted. In addition, in the present embodiment, it is the reading side that determines from which of the buffers to read, in order to read from a buffer that is as new as possible.

For example, first, since image frames that are updated as needed are being written into/read from the frame buffers, when writing ½ compressed images, if the images are 30 fps (frame/second), writing would be synchronized with the input images and the image frames are written from top to bottom at $1/30$ sec$\approx$33 msec while the reading side would generate synthesized images also at about 33 msec, therefore, the ½ compressed images would be read at about 17 msec, which is half of that time.

Consequently, reading speed is faster than writing speed, and reading overtakes writing. In so doing, since an old image frame, which is one before from the point where overtaking occurred, is read for the read image, the images become corrupted. This phenomenon is described in detail in JP-A 2005-244391.

To solve the above problem, a frame buffer having double buffer configuration is used to prevent the reading side from overtaking the writing side. More specifically, the requesting unit 160 performs buffer determination as described below.

Figure 10:
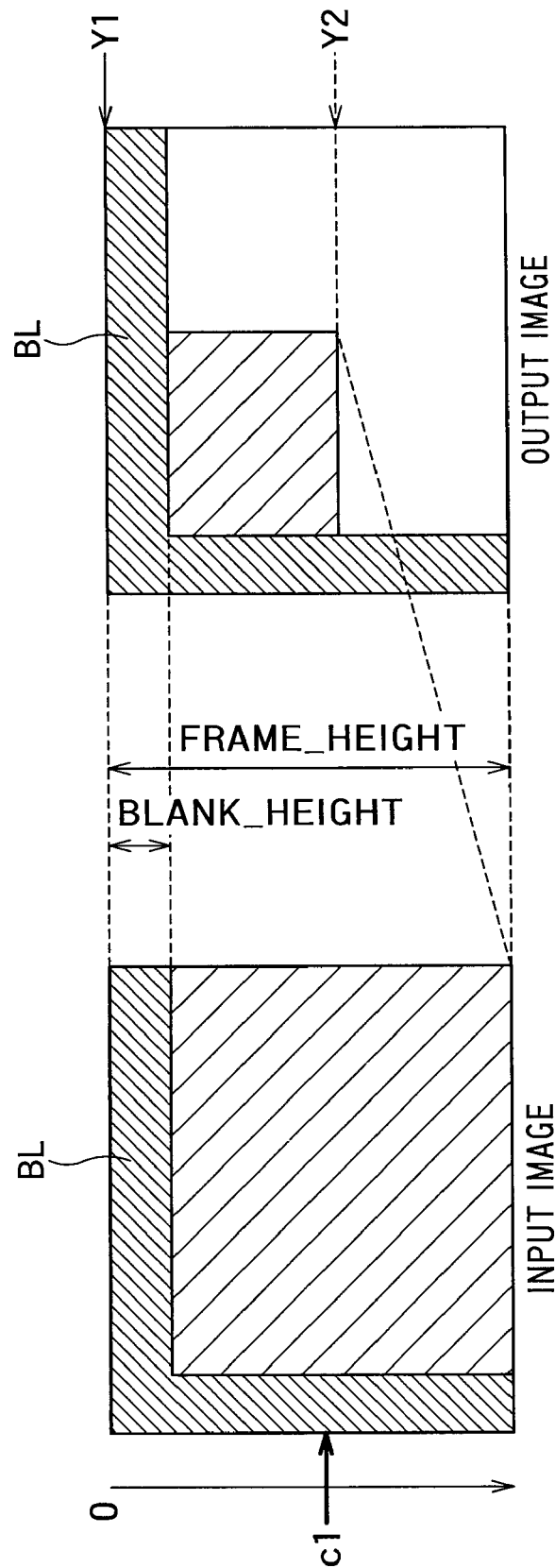
FIG. 10 is an illustration showing the relationship of an input image and an output image.

FIG. 10 shows a state of the input image and the output image. BL represents a blank portion in the image. The input image is compressed to ½ as described above, and laid out as shown by a shadow area in the upper left of the output image. It is assumed that, when the synthesizing units 140A to 140D are performing processing on a line 0 position where the solid arrow Y1 is shown in the right drawing, the compression units 120A to 120D are performing processing on a "c1" position.

First, since at the point of time when the synthesizing units 140A to 140D complete output of the compressed images, that is to say, at the point of time when the arrow in the right drawing moves to the dotted arrow Y2, an advancement by BLANK_HEIGHT+(FRAME_HEIGHT−BLANK_HEIGHT)/2 from current is meant, the line being processed by the compressing units 120A to 120D is supposed to be c1+BLANK_HEIGHT+(FRAME_HEIGHT−BLANK_HEIGHT)/2.

When the processing is still being performed on the current frame, if reading is performed from one buffer of the double buffers where writing is being performed, overtaking occurs, therefore, the other buffer than the buffer where writing is performed should be used as a reading buffer. This condition is expressed as follows: c1+BLANK_HEIGHT+(FRAME_HEIGHT−BLANK_HEIGHT)/ 2$\leq$FRAME_HEIGHT$\rightarrow$c1$\leq$(FRAME_HEIGHT−BLANK_HEIGHT)/2

As described above, by using the position (in this case "c1") on the image frame where the compression units 120A to 120D are currently processing, it is possible to perform the reading from a buffer that is as new as possible, and prevent images from being corrupted due to overtaking.

The above buffer selection is performed by the buffer selection unit 170 shown in FIG. 9, however, if this operation is performed by a plurality of image synthesizing circuits 40A and 40B, the image synthesizing circuits 40A and 40B have to send line numbers to each other where the compression units 120A to 120D are processing.

As shown in FIG. 9, information on the line numbers where the compression units 120A to 120D are processing is sent to the sending unit 100, on the other hand, the receiving unit 110 receives the information on the line numbers where the compression units in the other image synthesizing circuit 40B are processing, and passes the information to the buffer selection unit 170.

If the pixel data is requested to its own SDRAM controller 130, the buffer selection unit 170 uses the current line number of its own input image where its own compression units 120A to 120D are processing to select the buffer, on the other hand, if the pixel data is requested to the other image synthesizing circuit 40B, the buffer selection unit 170 uses the current line number of the other input image received from the receiving unit 110 to select the buffer.

In this way, by sending the current line number of the input image to the party image synthesizing circuit, it is possible to achieve appropriate buffer selection even if there is any phase contrast between respective input images of image synthesizing circuits 40A and 40B.

This allows the respective phases of a plurality of input images to remain asynchronous although it is difficult to synchronize the input images between considerably different devices, therefore, it is possible to facilitate the achievement of the present embodiment. In addition, as described above, the line number may be multiplexed with the pixel data and request information, and sent by the sending unit 100. In this way, the number of signal lines can be reduced, therefore, it is possible to facilitate the achievement of the present embodiment.

Fourth Embodiment

Figure 11:
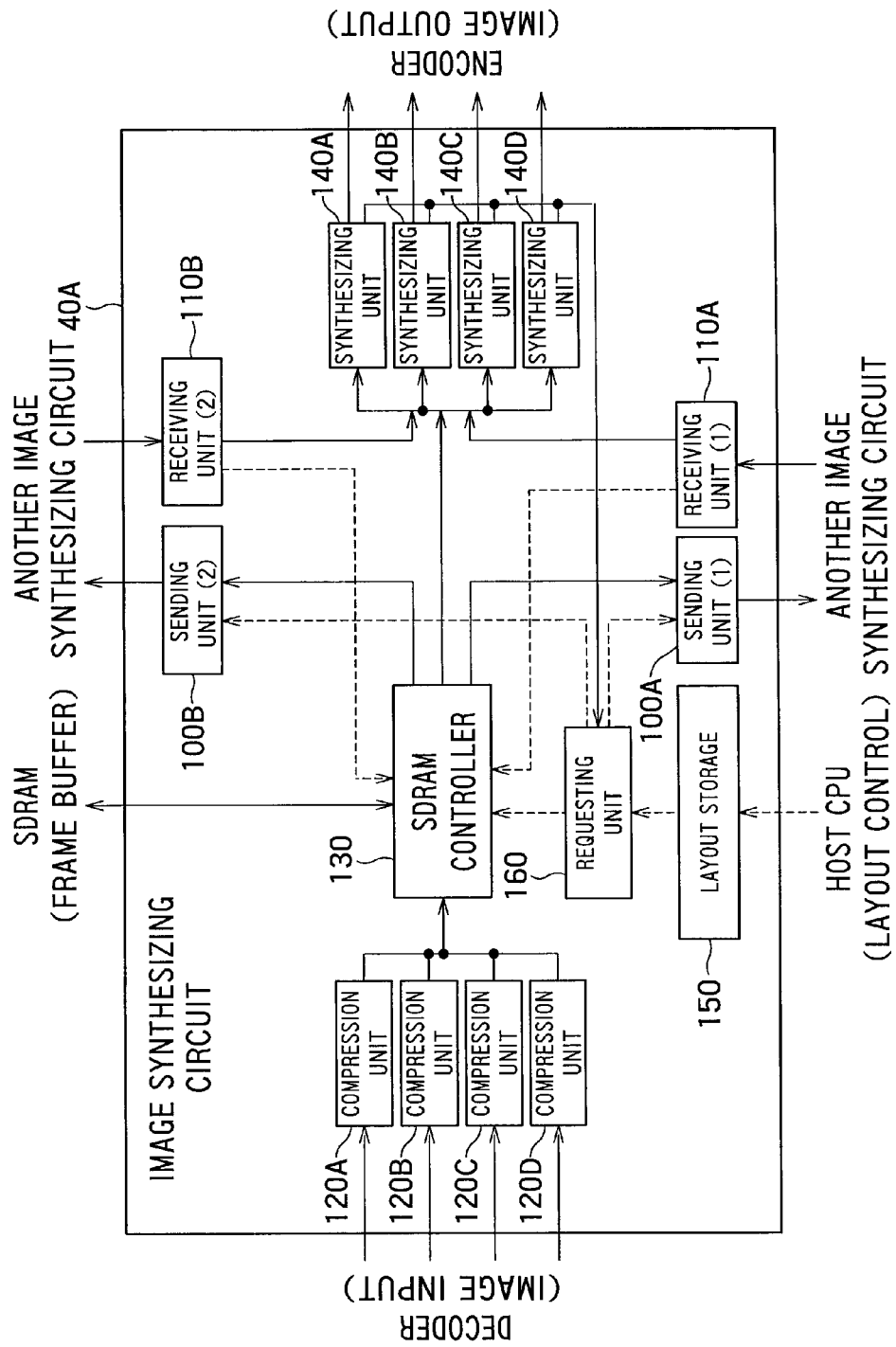
FIG. 11 is a block diagram showing the configuration of an image synthesis circuit according to a fourth embodiment of the present invention.
Figure 12:
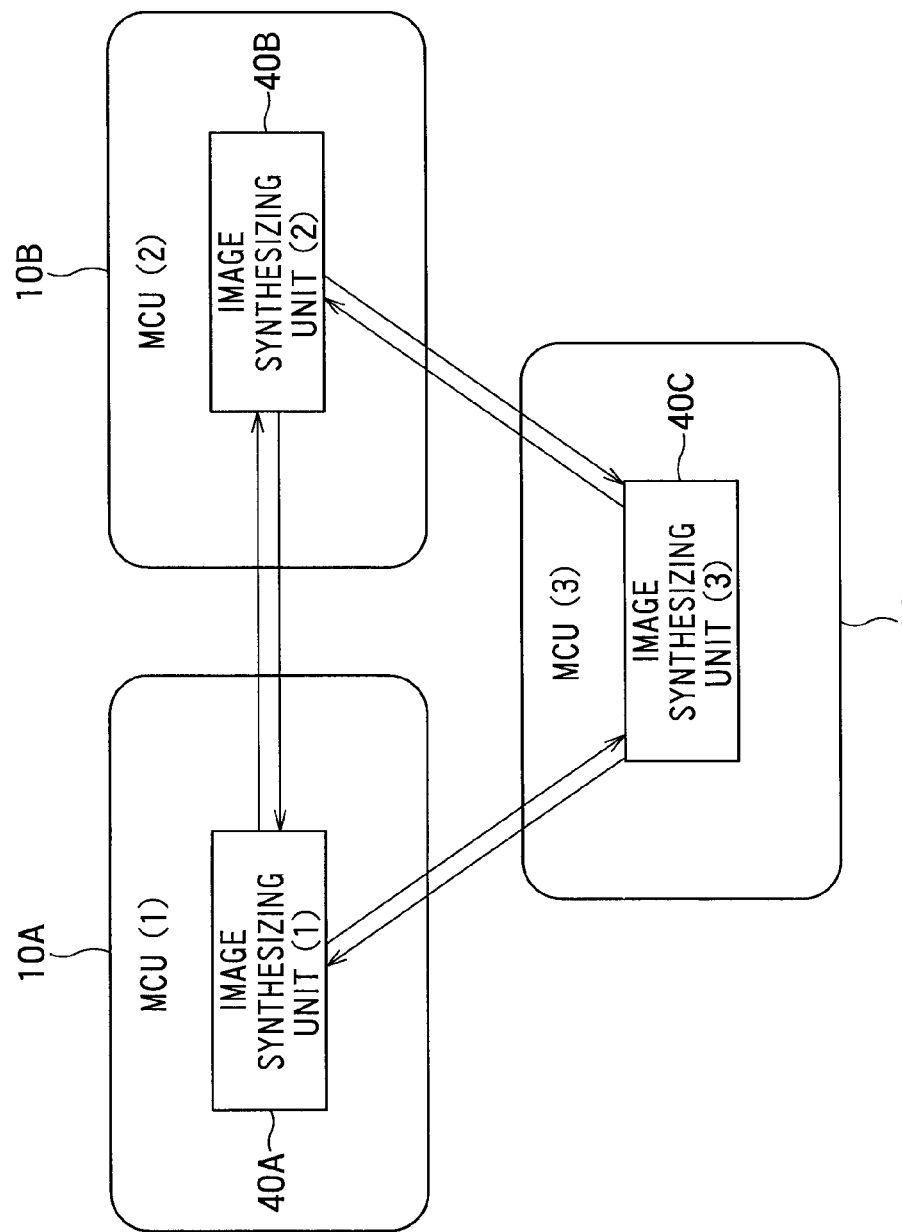
FIG. 12 is a block diagram showing the configuration of a system in which three MCUs are connected.

A fourth embodiment of the present invention is shown in FIG. 11. The fourth embodiment represents a case where the three MCUs shown in the previous embodiment are connected as shown in FIG. 12. In this case, two sending units and two receiving units are provided to connect to two image synthesizing circuits. For example, it is assumed that the sending unit (1) 100A and the receiving unit (1) 110A in the image synthesizing circuit (1) 40A are connected to the MCU (2) 10B, and the sending unit (2) 100B and the receiving unit (2) 110B are connected to the MCU (3) 10C.

The basic operation is the same as the case where two MCUs are connected. The layout information similarly contains images input into the other two MCUs, and, for example, the requesting unit 160 in the MCU (1) 40A analyzes the layout information, generates request information for the input image to be requested to its own SDRAM controller 130, request information for the input image to be requested to the SDRAM controller in the MCU (2) 10B, and request information for the input image to be requested to the SDR controller in the MCU (3) 10C, and passes them to the SDRAM controller 130, the sending unit (1) 100A and the sending unit (2) 100B, respectively.

The sending unit (1) 100A sends the information to the MCU (2) 10B, and the sending unit (2) 100B sends the information to the MCU (3). On the other hand, the receiving units (1) 110A and (2) 110B receive the request information from the MCU (2) 10B and the MCU (3) 10C, and pass the received request information to the SDRAM controller 130.

The SDRAM controller 130 receives a request not only from its own MCU, but also from the MCUs (2) 10B and (3) 10C, and passes the read pixel data to the synthesizing units 140A to 140D in response to the request from its own MCU, the read pixel data to the sending unit (1) 100A in response to the request from the MCU (2) 10B, and the read pixel data to the sending unit (2) 100B in response to the request from the MCU (3) 10C.

On the other hand, the receiving unit (1) 110A receives the pixel data from the MCU (2) 10B as a response to the request information sent to the MCU (2) 10B, and the receiving unit (2) 110B receives the pixel data from the MCU (3) 10C as a response to the request information sent to the MCU (3) 10C.

The synthesizing units use the pixel data from the SDRAM controller 130 for its own input image, and use the pixel data from the receiving units (1) 110A and (2) 110B for the input images of the MCUs (2) 10B and (3) 10C, respectively, to generate synthesized image where the input images of the MCUs (1) 10A, (2) 10B and (3) 10C are laid out.

As described above, the present embodiment may be expanded to three connections. In addition, the present embodiment may be expanded to four or more connections similarly. In this case, similarly, each image synthesizing circuit connects to all the image synthesizing circuit other than itself.

Fifth Embodiment

Figure 13:
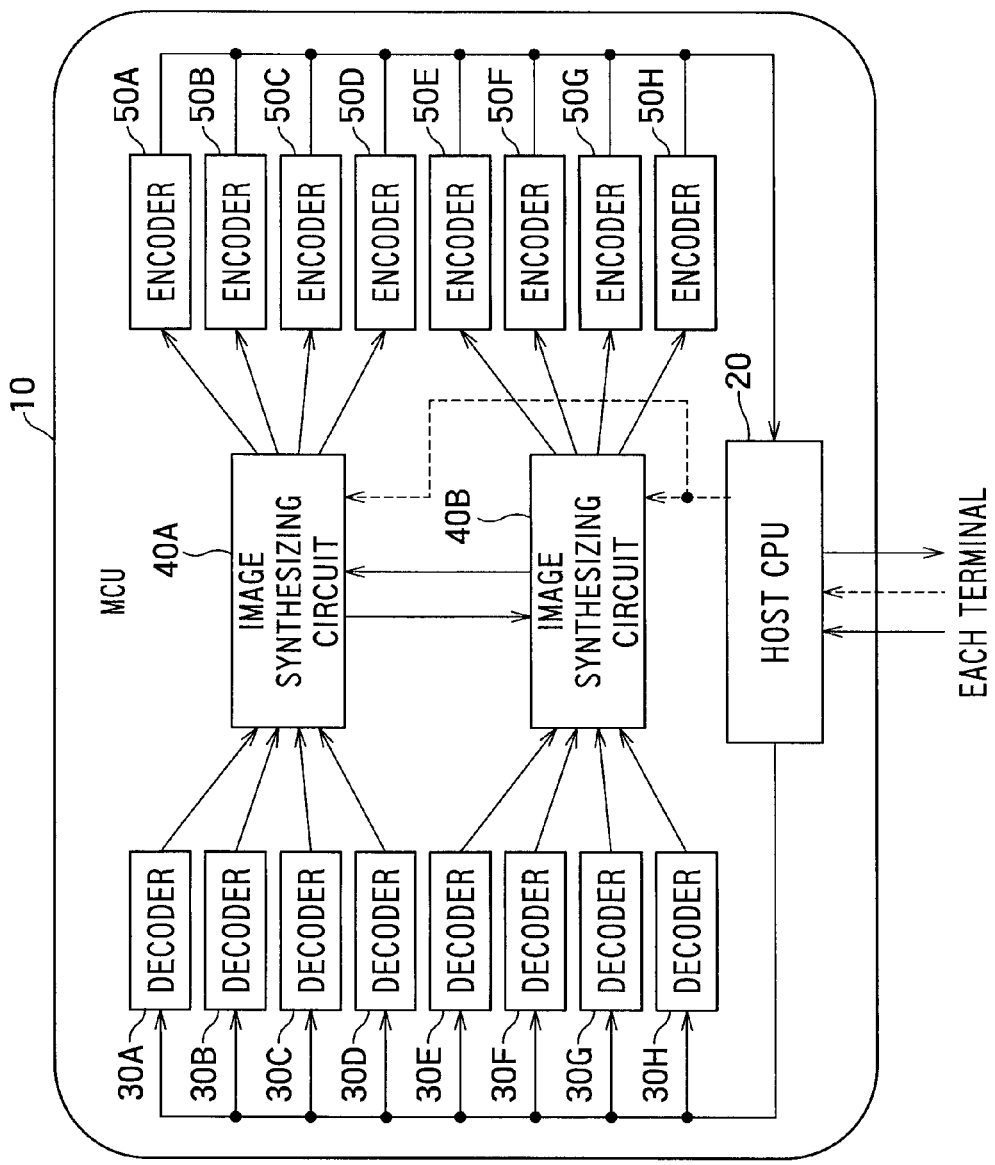
FIG. 13 is a block diagram showing the configuration of an MCU according to a fifth embodiment of the present invention.
Figure 14:
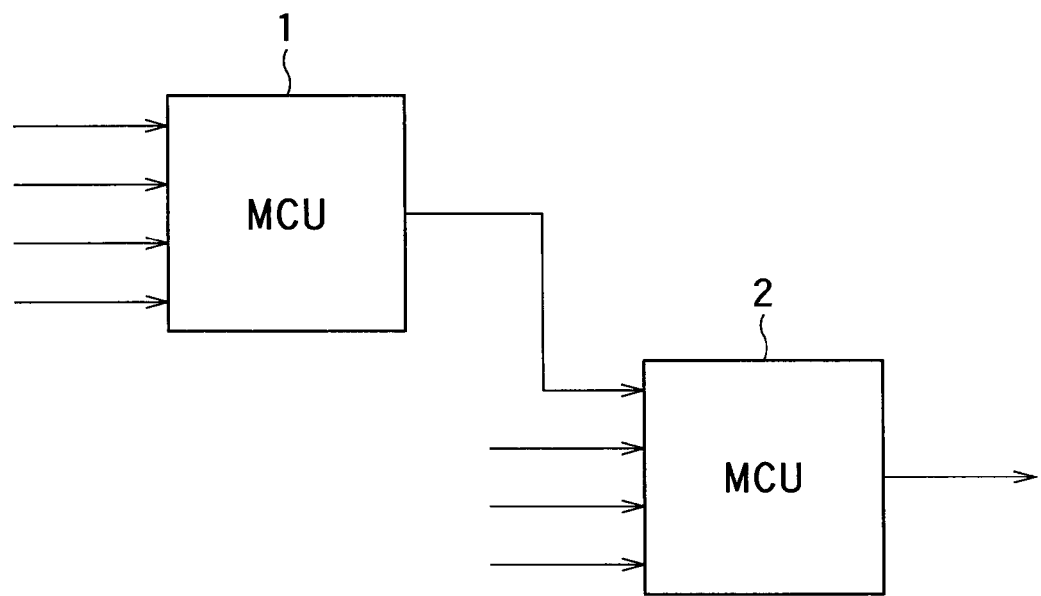
FIG. 14 is a block diagram showing the configuration of a conventional system in which two MCUs are connected.
Figure 15:
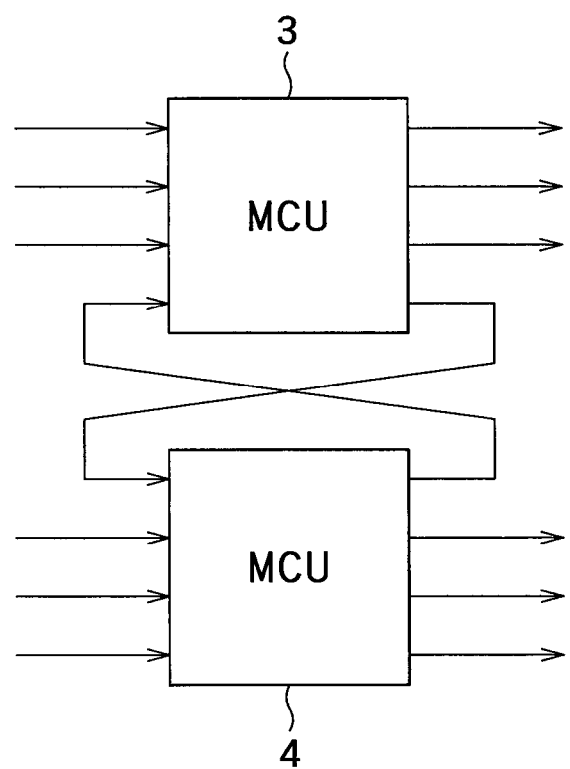
FIG. 15 is a block diagram showing the configuration of a conventional system in which two MCUs are connected.

A fifth embodiment of the present invention is shown in FIG. 13. In the fifth embodiment, a plurality of LSIs for achieving the image synthesizing circuit shown in the previous embodiment are mounted on one device. FIG. 13 shows an example where two image synthesizing circuits 40A and 40B, each of which has four inputs and four outputs, are provided to achieve eight inputs and eight outputs, however, as described in the third embodiment, three or more image synthesizing circuits may be provided to achieve many number of inputs/outputs.

In this way, when realizing various numbers of inputs/outputs, the numbers of inputs/outputs can be achieved scalably and without waste, by preparing one image synthesizing LSI and providing, as necessary a plurality of the LSIs, without having to provide a plurality of types of image synthesis LSIs having different numbers of inputs/outputs. In addition, a plurality of image synthesizing circuits may exist in one LSI. In this way, in the present embodiment, the configuration of the implementation is an insignificant matter.

What is claimed is:

1. An image synthesizing device for generating one or more synthesized images from input images using the image layout information prepared in advance for each of the one or more synthesized images, comprising:
    a connection unit configured to connect to another image synthesizing device;
    a layout storage configured to store the image layout information of one or more synthesized images where a plurality of input images input into the image synthesizing device and the another image synthesizing device are laid out in desired positions;
    an image storage configured to temporarily store the plurality of input images;
    a first reading request unit configured to perform a first reading request by specifying the input images to be read from the image storage using the image layout information in the layout storage;
    a second reading request unit configured to perform a second reading request by specifying the input images to be read from an image storage in the another image synthesizing device using the image layout information in the layout storage;

a request sending unit configured to send the second reading request by the second reading request unit to the another image synthesizing device;

a reading control unit configured to read the input images specified by the first reading request of the first reading request unit from the image storage, as image information;

an image information receiving unit configured to receive the image information sent from an image information sending unit in the another image synthesizing device; and one or more synthesized image generating units configured to generate the one or more synthesized images using the image information read by the reading control unit and the image information received by the image information receiving unit.

2. The device according to claim 1, further comprising:

a request receiving unit configured to receive the second reading request sent by the request sending unit in the another image synthesizing device, wherein the reading control unit further comprises an image information sending unit configured to read the input images specified by the second reading request received by the request receiving unit from the image storage, as the image information and to send the image information read in response to the second reading request received by the request receiving unit to the another image synthesizing device.

3. The device according to claim 2, further comprising:

a plurality of compression units associated with each of the input images input into the image synthesizing device, and configured to compress the input images at one or more reduction ratios, respectively, to generate a plurality of compressed image groups, wherein the image storage stores the plurality of compressed image groups, the first reading request unit performs the first reading request by specifying one of one or more compressed images that form the compressed image group for each input image to be read, the second reading request unit performs the second reading request by specifying one of one or more compressed images that form the compressed image group for each input image to be read, and the reading control unit reads out the compressed images of the input images to be read, specified by the first reading request by the first reading request unit and the compressed images of the input images to be read, specified by the second reading request received by the request receiving unit from the image storage.

4. The device according to claim 2, further comprising:

an information sending unit configured to multiplex and send the second reading request sent by the request sending unit and the image information sent by the image information sending unit to the another image synthesizing device, and an information receiving unit configured to receive information in which the second reading request and the image information are multiplex, sent by the information sending unit in the another image synthesizing device, divide received information into the second reading request and the image information, give the second reading request to the reading control unit, and give the image information to the synthesized image generating unit.

5. The device according to claim 1, wherein the synthesized image generating unit gets the image information read by the reading control unit and the image information received by the image information receiving unit so that the first and image information are associated with the image layout information.

6. The device according to claim 1, further comprising:

a synthetic information generating unit configured to generate synthetic information in which order of synthesis is defined when the synthesized image generating unit generates the synthesized image, by using the image layout information, and give the synthetic information to the synthesized image generating unit, wherein the synthesized image generating unit generates the synthesized image using the synthetic information.

7. The device according to claim 6, wherein the synthesized image generating unit generates the synthesized image line by line, and keeps a line number of the synthesized image that is currently being generated, the first reading request unit performs the first reading request by specifying the line number of each input image positioned on the line having a line number that is ahead of the line number of the synthesized image, the second reading request unit performs the second reading request by specifying the line number of each input image positioned on the line having a line number that is ahead of the line number of the synthesized image, the reading control unit reads the line having the line number specified by the first reading request in the input images specified by the first reading request from the image storage, the image information receiving unit receives the line having the line number specified by the second reading request in the input images specified by the second reading request from the another image synthesizing device, and the synthesized image generating unit generates the line of the synthesized image by using the line read by the reading control unit and the line received by the image information receiving unit.

8. The device according to claim 7, wherein the number that is ahead of the line number of the synthesized image is the line number of the line that is two lines forward with respect to the line number of the synthesized image.

9. The device according to claim 8, wherein the synthetic information generating unit generates the synthetic information having a number that is two lines ahead of the line number of the synthesized image currently being generated, and passes the synthetic information to the synthesized image generating unit, and the synthesized image generating unit temporarily stores the synthetic information, reads stored synthetic information when the line number of the synthesized image that is currently being generated goes to the line number that is two lines ahead, and generates the synthesized image according to read synthetic information.

10. The device according to claim 1, comprising:

a writing control unit configured to write each input image into the image storage, and keep a writing line number of the input image that is currently being written into the image storage;

a writing line number sending unit configured to send the writing line number to the another image synthesizing device, and a writing line number receiving unit configured to receive the writing line number sent from the writing line number sending unit in the another image synthesizing device, wherein the image storage has first and second storage areas, and alternately stores the input images in the first and second storage areas on an image frame basis, the first reading request unit uses the writing line number kept by the writing control unit, determine from which of the first storage area or second storage in the image storage to read the input images, and specifies determined storage area to perform the first reading request, the second reading request unit uses the writing line number received by the writing line number receiving unit, determine from which of the first storage area or second storage in the image storage in the another image synthesizing device to read the input images, and specifies determined storage area to perform the second reading request, and the reading control unit reads the input images from specified storage area in the image storage.

11. An image synthesizing method for generating one or more synthesized images from input images using the image layout information prepared in advance for each of the one or more synthesized images, comprising:
    connecting to another image synthesizing device;
    storing the image layout information of one or more synthesized images where a plurality of input images input into the image synthesizing device and the another image synthesizing device are laid out in desired positions;
    storing the plurality of input images temporarily;
    performing a first reading request by specifying the input images to be read from the image storage using the image layout information;
    performing a second reading request by specifying the input images to be read from an image storage in the another image synthesizing device using the image layout information;
    sending the second reading request to the another image synthesizing device;
    reading the input images specified by the first reading request from the image storage, as image information;
    receiving the image information sent from the another image synthesizing device; and
    generating the one or more synthesized images using the image information read by the image storage and the image information received from the another image synthesizing device.

12. A computer readable medium storing a computer program for causing a computer generating one or more synthesized images from input images using the image layout information prepared in advance for each of the one or more synthesized images, to execute instructions to perform steps of:
    connecting to another image synthesizing device;
    storing the image layout information of one or more synthesized images where a plurality of input images input into the image synthesizing device and the another image synthesizing device are laid out in desired positions;
    storing the plurality of input images temporarily;
    performing a first reading request by specifying the input images to be read from the image storage using the image layout information;
    performing a second reading request by specifying the input images to be read from an image storage in the another image synthesizing device using the image layout information;
    sending the second reading request to the another image synthesizing device;
    reading the input images specified by the first reading request from the image storage, as image information;
    receiving the image information sent from the another image synthesizing device; and
    generating the one or more synthesized images using the image information read by the image storage and the image information received from the another image synthesizing device.

* * * * *